United States Patent
Lee

(10) Patent No.: US 11,462,801 B2
(45) Date of Patent: Oct. 4, 2022

(54) BATTERY MODULE HAVING STRUCTURE CAPABLE OF PREVENTING INFLOW OF AIR INTO MODULE WHEN THERMAL RUNAWAY OCCURS AND BATTERY PACK INCLUDING SAME

(71) Applicant: LG CHEM, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 220 days.

(21) Appl. No.: 17/051,270

(22) PCT Filed: Mar. 4, 2020

(86) PCT No.: PCT/KR2020/003083
§ 371 (c)(1),
(2) Date: Oct. 28, 2020

(87) PCT Pub. No.: WO2020/180115
PCT Pub. Date: Sep. 10, 2020

(65) Prior Publication Data
US 2021/0050573 A1    Feb. 18, 2021

(30) Foreign Application Priority Data

Mar. 6, 2019    (KR) .................... 10-2019-0025995

(51) Int. Cl.
*H01M 50/375*    (2021.01)
*H01M 50/30*    (2021.01)
(Continued)

(52) U.S. Cl.
CPC ....... *H01M 50/375* (2021.01); *H01M 50/209* (2021.01); *H01M 50/325* (2021.01);
(Continued)

(58) Field of Classification Search
CPC ............ H01M 50/375; H01M 50/209; H01M 50/394; H01M 50/383; H01M 50/325;
(Continued)

(56) References Cited

U.S. PATENT DOCUMENTS

| | | |
|---|---|---|
| 6,326,100 B1 | 12/2001 | Han et al. |
| 2011/0064983 A1 | 3/2011 | Yokoyama et al. |

(Continued)

FOREIGN PATENT DOCUMENTS

| | | |
|---|---|---|
| DE | 101 13 371 A1 | 10/2002 |
| EP | 3644402 A1 * | 4/2020 |

(Continued)

OTHER PUBLICATIONS

EPO machine generated English translation of JP 2015-153616A (Year: 2015).*

(Continued)

*Primary Examiner* — Christopher P Domone
*Assistant Examiner* — Kimberly Wyluda
(74) *Attorney, Agent, or Firm* — Birch, Stewart, Kolasch & Birch, LLP

(57) ABSTRACT

A battery module includes a cell stack having a plurality of battery cells; a module case configured to accommodate the cell stack; a pair of module covers configured to cover openings at both sides of the module case; and a ventilation unit installed through the module cover. The ventilation unit includes a one-way venting valve disposed at a center of a perforation hole formed through the module cover; a first hole sealing portion attached onto an inner wall of the perforation hole; and a second hole sealing portion attached onto an outer circumference of the one-way venting valve.

10 Claims, 11 Drawing Sheets

(51) Int. Cl.
*H01M 50/325* (2021.01)
*H01M 50/383* (2021.01)
*H01M 50/209* (2021.01)
*H01M 50/20* (2021.01)

(52) U.S. Cl.
CPC ....... *H01M 50/383* (2021.01); *H01M 50/394* (2021.01); *H01M 50/20* (2021.01); *H01M 2200/10* (2013.01); *H01M 2200/20* (2013.01)

(58) Field of Classification Search
CPC ............. H01M 50/20; H01M 2200/10; H01M 2200/20
See application file for complete search history.

(56) References Cited

U.S. PATENT DOCUMENTS

| | | |
|---|---|---|
| 2013/0075116 A1 | 3/2013 | Lim et al. |
| 2015/0056482 A1 | 2/2015 | Kyla-Kaila et al. |
| 2017/0025664 A1 | 1/2017 | Lim et al. |

FOREIGN PATENT DOCUMENTS

| | | |
|---|---|---|
| JP | 2003-31208 A | 1/2003 |
| JP | 2006-253020 A | 9/2006 |
| JP | 2015-153616 A | 8/2015 |
| JP | 5993209 B2 | 9/2016 |
| KR | 10-0369068 B1 | 1/2003 |
| KR | 10-1179364 B1 | 9/2012 |
| KR | 10-2013-0032963 A | 4/2013 |
| KR | 10-2015-0003779 A | 1/2015 |
| KR | 10-2017-0010531 A | 2/2017 |
| KR | 10-2017-0032034 A | 3/2017 |
| KR | 10-1780775 B1 | 10/2017 |
| KR | 10-1917279 B1 | 11/2018 |
| KR | 10-2019-0002992 A | 1/2019 |

OTHER PUBLICATIONS

EPO machine generated English translation of JP 2013-246920A (Year: 2013).*

EPO machine generated English translation of EP 3644402A1 (Year: 2020).*

Extended European Search Report for European Application No. 20765773.5, dated Oct. 12, 2021.

International Search Report (PCT/ISA/210) issued in PCT/KR2020/003083 dated Jun. 17, 2020.

* cited by examiner

BATTERY MODULE HAVING STRUCTURE CAPABLE OF PREVENTING INFLOW OF AIR INTO MODULE WHEN THERMAL RUNAWAY OCCURS AND BATTERY PACK INCLUDING SAME

TECHNICAL FIELD

The present disclosure relates to a battery module having a structure capable of blocking air introduction into a module when a thermal runaway phenomenon occurs, and a battery pack including the battery module. More specifically, the present disclosure relates to a battery module having a structure capable of blocking introduction of an external air and just allowing gas discharge to the outside when a temperature in the battery module increases, by applying a thermally expanding material to an inner edge of a module case and applying a one-way venting valve and a thermally expanding material to an inner portion of a ventilation unit for cooling, and a battery pack including the battery module.

The present application claims priority to Korean Patent Application No. 10-2019-0025995 filed on Mar. 6, 2019 in the Republic of Korea, the disclosures of which are incorporated herein by reference.

BACKGROUND ART

In a battery module that includes a plurality of battery cells, if an abnormality such as a short circuit occurs in some battery cells to raise temperature continuously so that the temperature of the battery cell exceeds a critical temperature, a thermal runaway phenomenon occurs. If a thermal runaway phenomenon occurs in some battery cells as described above, safety issues may be generated.

If a flame or the like is generated due to the thermal runaway phenomenon occurring in some battery cells, the flame rapidly raises the temperature of adjacent battery cells, and thus the thermal runaway phenomenon may be propagated to adjacent cells within a short time.

Eventually, if the thermal runaway phenomenon occurring in some battery cells is not quickly responded, it may lead to disasters such as ignition and explosion of a battery module or a battery pack, which is a battery unit with a greater capacity than the battery cell, and this may not only result in property damage but also cause safety problems.

Thus, if a flame occurs due to the thermal runaway phenomenon in some battery cells inside the battery module, it is urgently necessary to block air supplied to the flame to prevent the flame from spreading further. In addition, it is also important to lower the inner pressure of the battery module by quickly discharging the gas discharged by venting of the battery cell to the outside of the battery module.

In particular, a battery module adopting an air-cooled structure must have a structure capable of allowing an air to flow smoothly from the outside of the battery module to the inside thereof. Therefore, there is a demand to develop a battery module having a structure capable of quickly discharging a venting gas generated therein to the outside while completely blocking the air introduced therein when a thermal runaway phenomenon occurs inside the battery module.

DISCLOSURE

Technical Problem

The present disclosure is designed to solve the problems of the related art, and therefore the present disclosure is directed to providing a battery module having a structure capable of quickly discharging a venting gas generated therein to the outside while completely blocking the air introduced therein in order to prevent the flame from spreading further when a thermal runaway phenomenon occurs inside the battery module.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack having a plurality of battery cells a module case configured to accommodate the cell stack; a pair of module covers configured to cover openings at a pair of sides of the module case, respectively; and at least one ventilator installed through one of the pair of module covers, wherein the at least one ventilator includes: a one-way venting valve disposed at a center of a perforation hole formed through the module cover; a first hole sealing portion attached onto an inner wall of the perforation hole; and a second hole sealing portion attached onto an outer circumference of the one-way venting valve.

The first hole sealing portion and the second hole sealing portion may be expanded at a reference temperature or above to meet each other so that the perforation hole is sealed.

The first hole sealing portion and the second hole sealing portion may be made of a sheet containing at least one of an epoxy-based resin, a butyl-based resin and a vinyl chloride-based resin.

The one-way venting valve may discharge a venting gas from an inside thereof to the outside when a pressure inside the module case is a reference pressure or above.

The at least one ventilator may include a valve support configured to traverse the perforation hole, and the one-way venting valve may be fixed to the valve support.

The battery module may further comprise a case sealing portion attached onto an inner edge of the module case and a border area where an inner surface of the module case meets the module cover.

The case sealing portion may be expanded at a reference temperature or above to reinforce airtightness of the module case.

The one-way venting valve may include a lower cap having at least one first flow path; an upper cap having at least one second flow path and coupled to an upper portion of the lower cap to form an inner space; and a flow path cover located in the inner space and installed to cover the second flow path as being elastically pressed from the upper cap toward the lower cap.

The one-way venting valve may be made of an elastic material and has a funnel shape having an inner space gradually narrowed outward from an inner side of the module case so that facing surfaces at a top end of the one-way venting valve are in contact with each other.

Meanwhile, a battery pack according to an embodiment of the present disclosure includes a plurality of battery modules according to an embodiment of the present disclosure as described above.

Advantageous Effects

According to one aspect of the present disclosure, the battery module having a air-cooled structure may quickly discharge a venting gas generated therein to the outside while completely blocking the air introduced therein in order to prevent the flame from spreading further when a thermal runaway phenomenon occurs therein, thereby securing the safety of the battery module in use.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
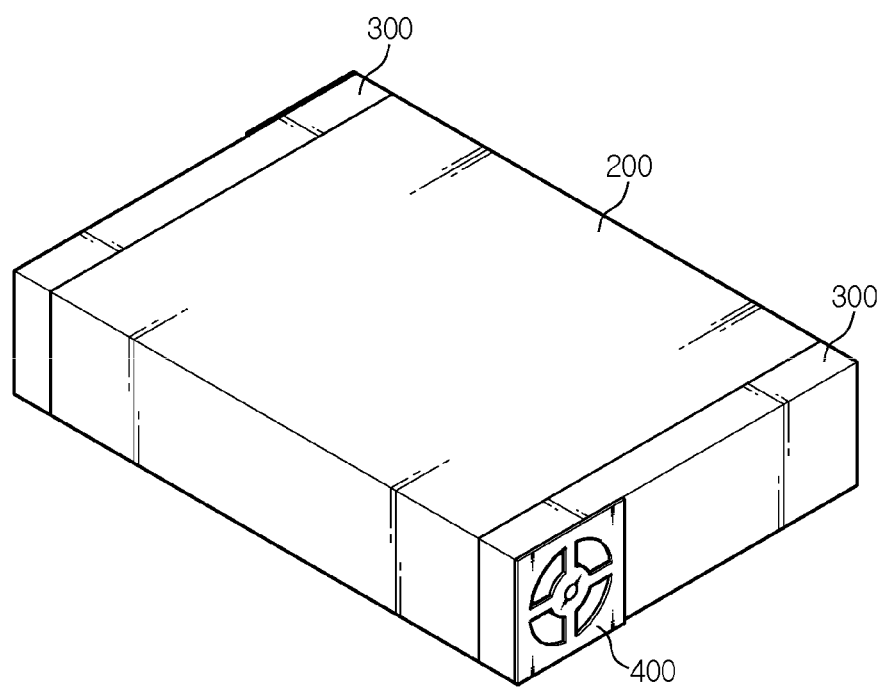
FIG. 1 is a perspective view showing a battery module according to an embodiment of the present disclosure.
Figure 2:
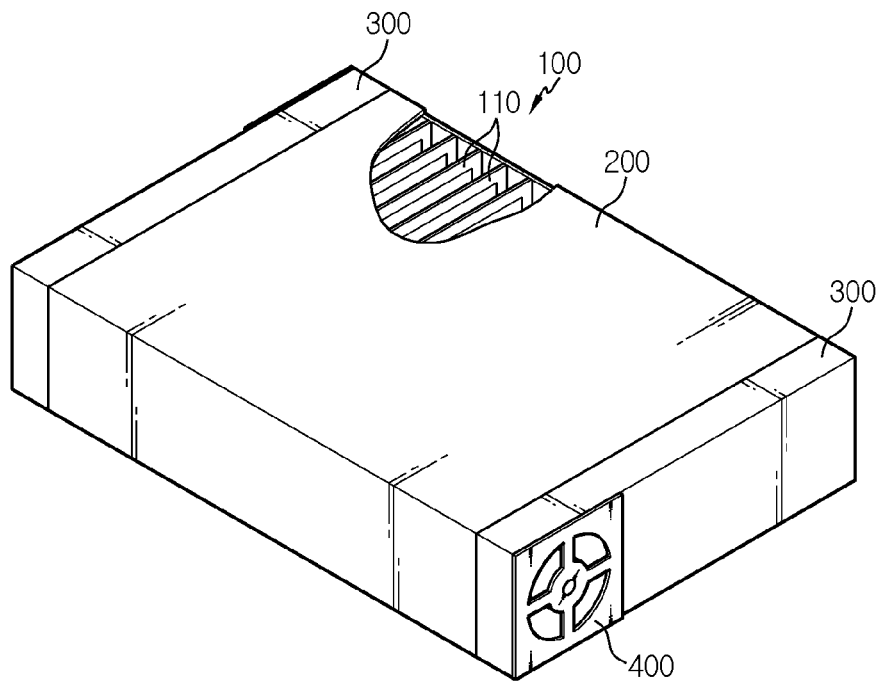
FIG. 2 is a diagram showing an inner configuration of the battery module according to an embodiment of the present disclosure.

Referring to FIGS. 1 and 2, a battery module according to an embodiment of the present disclosure includes a cell stack 100, a module case 200, a case sealing portion 250, a module cover 300, and a ventilation unit 400.

Referring to FIG. 2, the cell stack 100 is formed by stacking a plurality of battery cells 110. As the battery cell 110, for example, a pouch-type battery cell may be applied.

Figure 3:
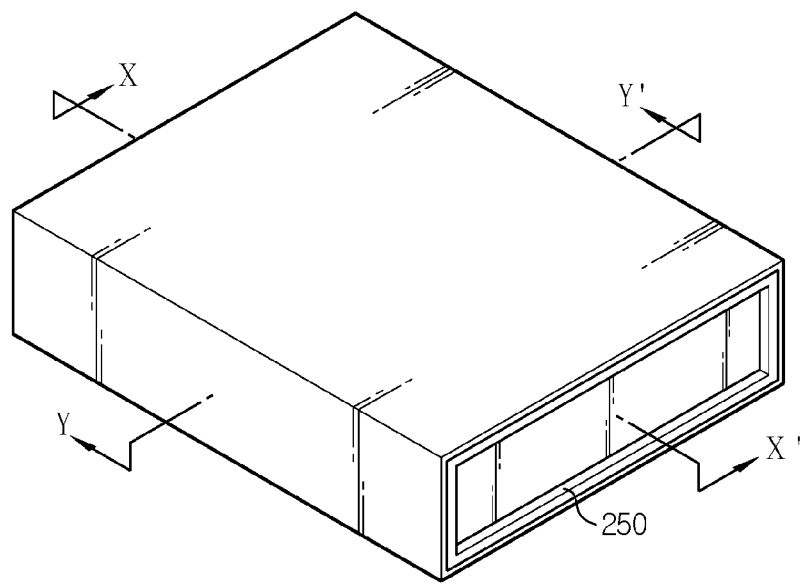
FIG. 3 is a perspective view showing a module case, employed at the battery module according to an embodiment of the present disclosure.

Referring to FIG. 3 along with FIGS. 1 and 2, the module case 200 has an approximately rectangular parallelepiped shape with openings at both longitudinal sides thereof. The module case 200 may be made of a metal material such as aluminum to secure rigidity.

The module case 200 may include an upper plate for covering an upper portion of the cell stack 100, a lower plate for covering a lower portion of the cell stack 100, and side plates for covering both sides of the cell stack 100. The coupling between the upper plate and the side plate and the coupling between the lower plate and the side plate may be performed by welding.

Figure 4:
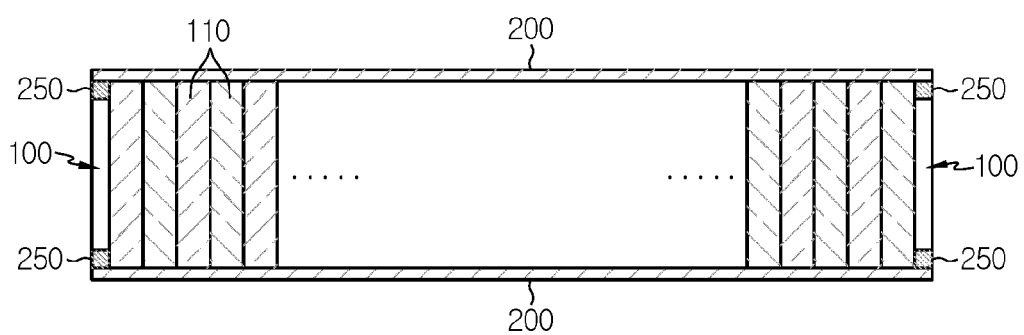
FIG. 4 is a sectional view, taken along the line X-X of FIG. 3.
Figure 5:
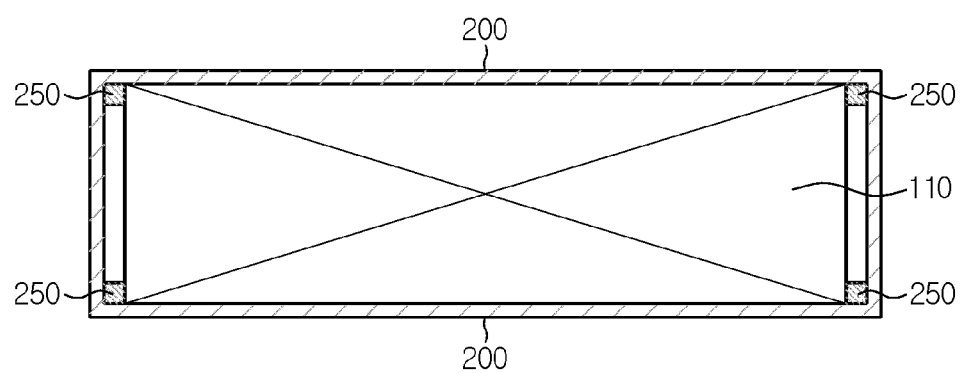
FIG. 5 is a sectional view, taken along the line Y-Y of FIG. 3.
Figure 6:
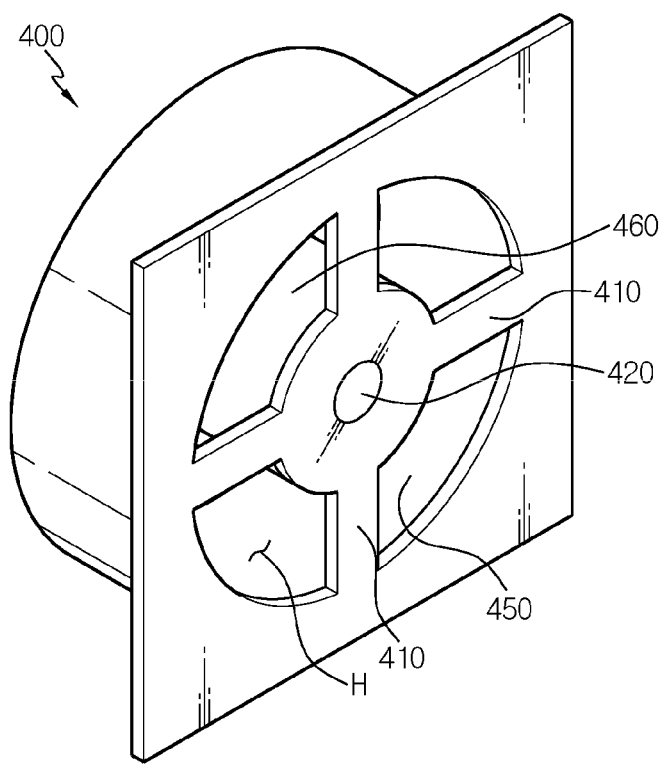
FIGS. 6 and 7 are diagrams showing that a ventilation unit employed at the battery module according to an embodiment of the present disclosure is opened.
Figure 7:
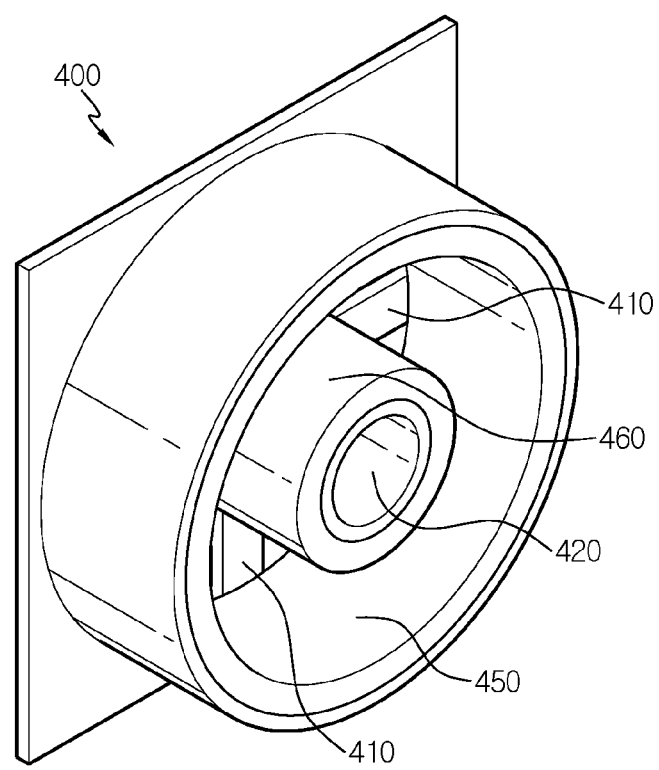
Figure 8:
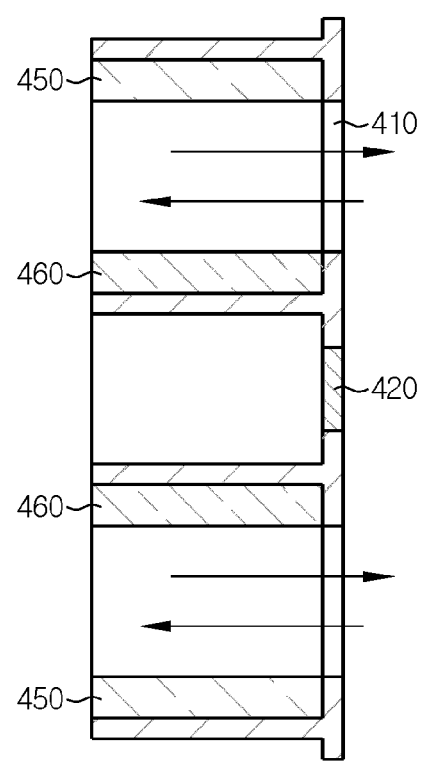
FIG. 8 is a sectional view showing the ventilation unit depicted in FIGS. 6 and 7.

Referring to FIGS. 3 to 5 along with FIGS. 1 and 2, the case sealing portion 250 is attached on a border area where an inner edge of the module case 200 and an inner surface of the module case 200 meet the module cover 300. That is, the case sealing portion 250 is attached on a border area where the upper plate and the side plate of the module case 200 meet, a border area where the lower plate and the side plate meet, and a periphery of the inner surface of the opening of the module case 200.

The case sealing portion 250 is expanded at a reference temperature or above to enhance the airtightness of the module case 200. If a problem such as a short circuit occurs in some of the plurality of battery cells 110 disposed inside the battery module and thus a temperature rises to cause a thermal runaway, it is necessary to completely block the introduction of an external air so that the flame is not propagated to neighboring cells. Since the case sealing portion 250 is disposed at a weak region of the module case 200 and expanded at or above the reference temperature at which a thermal runaway phenomenon occurs, the airtightness of the battery module is reinforced.

To perform this function, the case sealing portion 250 may be made of a sheet containing at least one of an epoxy-based resin, a butyl-based resin and a vinyl chloride-based resin. However, the component of the case sealing portion 250 is just exemplary, and any component may be applied thereto without limitation as long as it expands at the reference temperature or above to enhance airtightness.

Referring to FIGS. 1 to 3, the module cover 300 covers the openings at both longitudinal sides of the module case 200 and has a shape corresponding to the opening. The module cover 300 may also be made of a metal material for coupling with the module case 200 made of a metal material, and may be coupled with the module case 200 by welding.

As described above, since the case sealing portion 250 is also installed on the border area where the module case 200 and the module cover 300 meet, when the temperature inside the battery module rises to the reference temperature or above, the airtightness of the coupling portion of the module case 200 and the module cover 300 may be ensured.

Referring to FIGS. 6 to 11 along with FIGS. 1 and 2, the ventilation unit 400 is installed on one longitudinal side of the module cover 300, and the ventilation units 400 installed at the pair of module covers 300 are located at opposite sides. The ventilation unit 400 includes a perforation hole H, a valve support 410, a one-way venting valve 420, a first hole sealing portion 450 and a second hole sealing portion 460.

The perforation hole H is formed through one longitudinal side of the module cover 300, and functions as an air passage for cooling the battery cells 110 located inside the battery module when the battery module is in a normal use state. That is, if the perforation hole H formed at one longitudinal side of the battery module functions as an inlet, the perforation hole H located at the opposite side serves as an outlet.

The valve support 410 traverses the perforation hole H, and the one-way venting valve 420 is installed at a longitudinal center thereof. That is, the valve support 410 is a component provided for fixing the one-way venting valve.

The one-way venting valve 420 is fixedly installed at the center of the valve support 410 in the longitudinal direction, and when the inner pressure of the battery module rises to a reference pressure or above due to the gas generated by venting of the battery cell 110, the gas is discharged from the inside of the battery module to the outside. That is, the one-way venting valve 420 blocks the introduction of air from the outside of the battery module, and is opened to discharge gas only from the inside to the outside only when the inner pressure increases. Examples of the specific structure of the one-way venting valve 420 will be described in detail later with reference to FIGS. 12 to 16.

The first hole sealing portion 450 is attached around an inner wall of the perforation hole H. The second hole sealing portion 460 is attached on an outer circumference of the one-way venting valve. The first hole sealing portion 450 and the second hole sealing portion 460 are expanded at the reference temperature or above to meet each other, thereby sealing the perforation hole H.

To perform this function, the first hole sealing portion 450 and the second hole sealing portion 460 may be made of a sheet containing at least one of an epoxy resin, a butyl resin and a vinyl chloride resin, similar to the case sealing portion 250 described above. However, the materials of the first hole sealing portion 450 and the second hole sealing portion 460 are just examples, and various materials may be applied without limitation as long as they are capable of expanding at a reference temperature or above to seal the perforation hole H.

Figure 9:
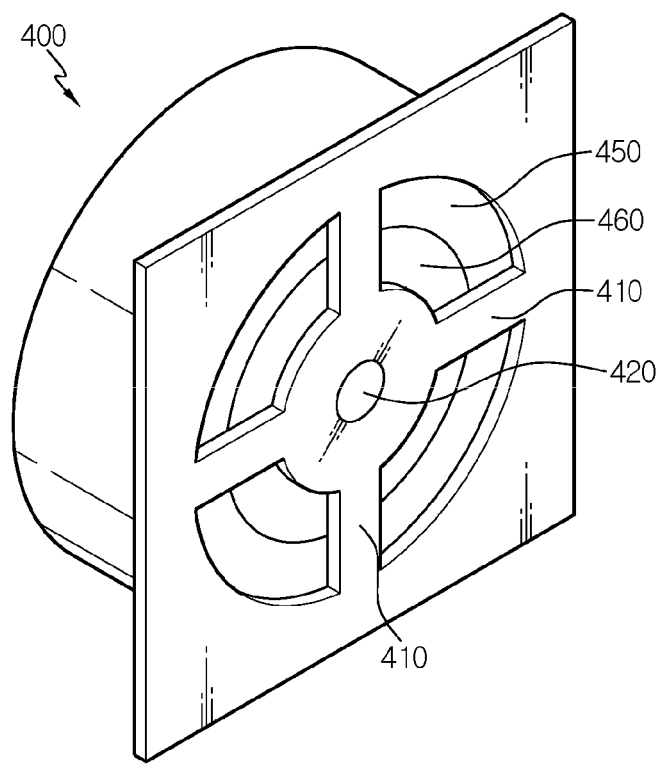
FIGS. 9 and 10 are diagrams showing that the ventilation unit employed at the battery module according to an embodiment of the present disclosure is closed.
Figure 10:
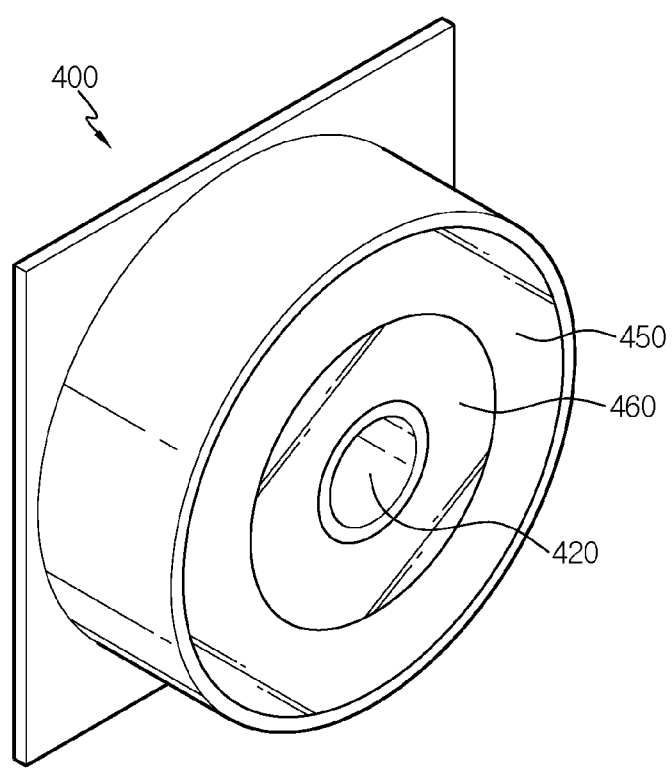
Figure 11:
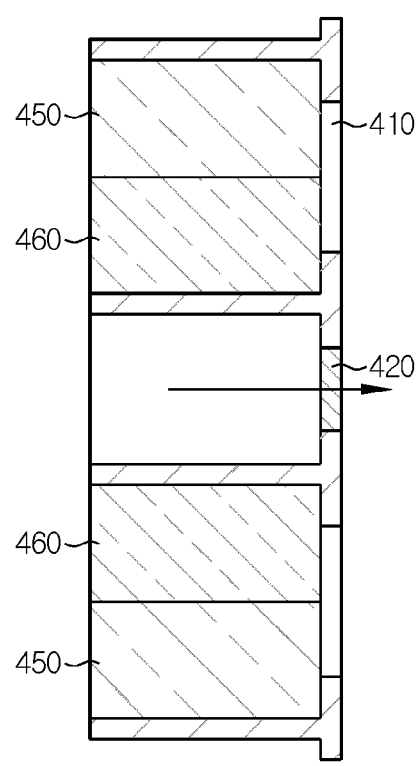
FIG. 11 is a sectional view showing the ventilation unit depicted in FIGS. 9 and 10.

As shown in FIGS. 9 to 11, if the first hole sealing portion 450 and the second hole sealing portion 460 are expanded to seal the perforation hole H, the air may not be introduced from the outside of the battery module any longer, and thus the flame does not spread due to a thermal runaway. In addition, if the gas leaked from the battery cell 110 increases inside the module case 200 due to the increase in temperature and thus the inner pressure of the battery module increases to the reference pressure or above, the one-way venting valve 420 is opened to discharge the gas, thereby preventing the battery module from exploding due to the increase in the inner pressure of the battery module.

As described above, since the battery module according to an embodiment of the present disclosure includes the sealing portions 250, 450, 460, which are expanded to seal the battery module when the internal temperature rises, and the one-way venting valve 420, which may discharge gas only from the inside to the outside as the internal pressure increases, it is possible to completely block the introduction of air from the outside in the event of a thermal runaway and quickly discharge the gas therein to the outside, thereby eliminating the risk of ignition/explosion.

Next, an exemplary structure of the one-way venting valve 420 applied to the present disclosure will be described with reference to FIGS. 12 to 16.

Figure 12:
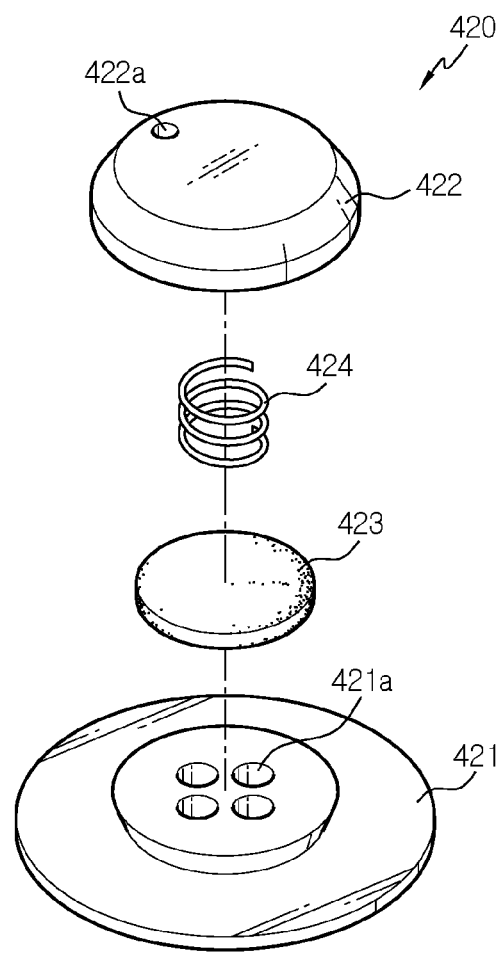
FIG. 12 is an exploded perspective view showing an embodiment of a one-way valve employed at the present disclosure.
Figure 13:
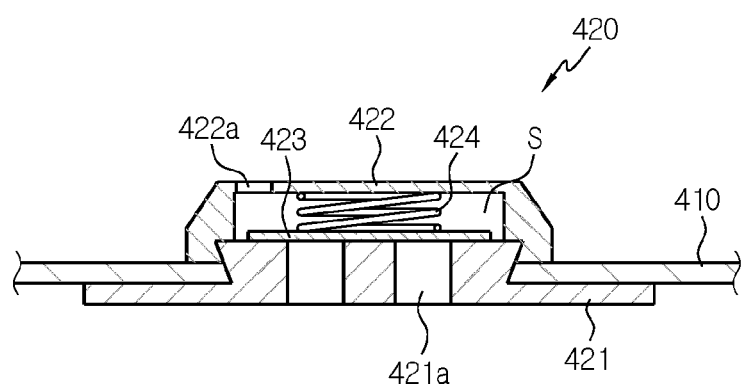
FIG. 13 is a sectional view showing that the one-way valve depicted in FIG. 12 is closed.
Figure 14:
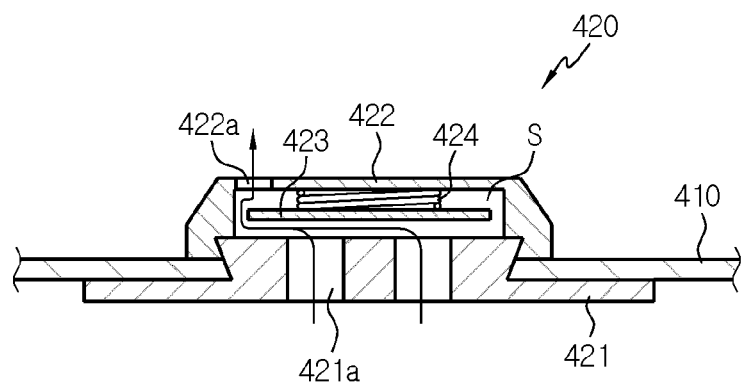
FIG. 14 is a sectional view showing that the one-way valve depicted in FIG. 12 is opened.

First, referring to FIGS. 12 to 14, one embodiment of the one-way venting valve 420 is illustrated. According to this embodiment, the one-way venting valve 420 may be a unidirectional valve including a lower cap 421 having at least one first flow path 421a, an upper cap 422 having at least one second flow path 422a, a flow path cover 423, and an elastic pressing member 424.

The upper cap 422 is formed at an upper portion of the lower cap 421 to form an inner space S. The flow path cover 423 is located in the inner space S and is elastically pressed from the upper cap 422 toward the lower cap 421 by the elastic pressing member 424 such as a spring to cover the first flow path 421a.

If the inner pressure of the battery module increases to the reference pressure or above, the flow path cover 423 compresses the elastic pressing member 424 to release the sealed state of the first flow path 421a, and the gas inside the battery module is discharged to the outside of the battery module through the inner space S and the second flow path 422a (see an arrow in FIG. 14).

Figure 15:
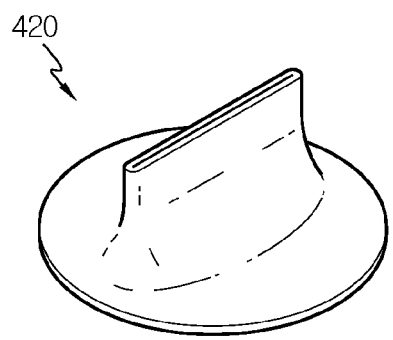
FIG. 15 is a perspective view showing another embodiment of the one-way valve employed at the present disclosure.
Figure 16:
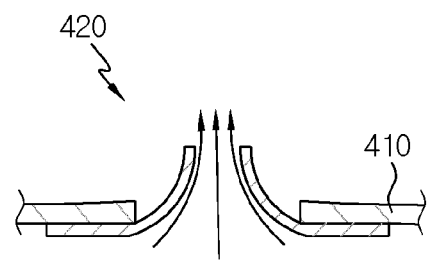
FIG. 16 is a sectional view showing that the one-way valve depicted in FIG. 15 is opened.

Next, referring to FIGS. 15 and 16, another embodiment of the one-way venting valve 420 is shown. According to this embodiment, the one-way venting valve 420 is made of an elastic material such as rubber, and has a funnel shape whose inner space is gradually narrowed outward from the inside of the battery module so that facing surfaces at a top end thereof (referring to an upper end when viewed with reference to FIG. 16) are in contact with each other. At a bottom end of the one-way venting valve 420 (referring to a lower end when viewed with reference to FIG. 16), facing surfaces thereof are spaced apart from each other.

If the inner pressure of the battery module increases to the reference pressure or above, the sealed state of the battery module is released as the top end of the elastic material of the one-way venting valve 420 is opened, and the gas inside the battery module is discharged to the outside along an arrow depicted in FIG. 16.

Meanwhile, in describing the present disclosure, two types of unidirectional valve structures are described as specific examples of the one-way venting valve 420, but the present disclosure is not limited thereto. That is, any structure capable of discharging the internal gas to the outside when the inner pressure of the battery module increases to the reference pressure or above may be applied to the battery module according to the present disclosure without limitation.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:
1. A battery module, comprising:
a cell stack having a plurality of battery cell;
a module case configured to accommodate the cell stack;
a pair of module covers configured to cover openings at a pair of sides of the module case, respectively; and
at least one ventilator installed through one of the pair of module covers,
wherein at least one ventilator includes:
a one-way venting valve disposed at a center of a perforation hole formed through the module cover;
a first hole sealing portion attached onto an inner wall of the perforation hole; and
a second hole sealing portion attached onto an outer circumference of the one-way venting valve, wherein the first hole sealing portion and the second hole sealing portion are expanded at a reference temperature or above to meet each other so that the perforation hole is sealed.

2. The battery module according to claim 1, wherein the first hole sealing portion and the second hole sealing portion are made of a sheet containing at least one of an epoxy-based resin, a butyl-based resin and a vinyl chloride-based resin.

3. The battery module according to claim 1, wherein the one-way venting valve discharges a venting gas from an inside thereof to the outside when a pressure inside the module case is a reference pressure or above.

4. The battery module according to claim 1, wherein the at least one ventilator includes a valve support configured to traverse the perforation hole, and
wherein the one-way venting valve is fixed to the valve support.

5. The battery module according to claim 1, further comprising:
a case sealing portion attached onto an inner edge of the module case and a border area where an inner surface of the module case meets the module cover.

6. The battery module according to claim 5, wherein the case sealing portion is expanded at a reference temperature or above to reinforce airtightness of the module case.

7. The battery module according to claim 1, wherein the one-way venting valve includes:
a lower cap having at least one first flow path;
an upper cap having at least one second flow path and coupled to an upper portion of the lower cap to form an inner space; and
a flow path cover located in the inner space and installed to cover the second flow path as being elastically pressed from the upper cap toward the lower cap.

8. The battery module according to claim 1, wherein the one-way venting valve is made of an elastic material and has a funnel shape having an inner space gradually narrowed outward from an inner side of the module case so that facing surfaces at a top end of the one-way venting valve are in contact with each other.

9. A battery pack, comprising a plurality of battery modules according to claim 1.

10. The battery module according to claim 1, wherein the at least one ventilator comprises a pair of ventilators, each of the pair of ventilators being located in a respective one of the pair of sides of the module case.

* * * * *